United States Patent [19]

Yamada et al.

[11] Patent Number: 4,953,676
[45] Date of Patent: Sep. 4, 1990

[54] SPRING COUPLER

[75] Inventors: Yukifumi Yamada; Takami Terada, both of Toyota; Keiichi Hibino, Okazaki, all of Japan

[73] Assignee: Aisin Seiko Co. Ltd., Japan

[21] Appl. No.: 197,919

[22] Filed: May 24, 1988

[30] Foreign Application Priority Data

May 29, 1987 [JP] Japan .............................. 62-85277[U]

[51] Int. Cl.⁵ .............................................. F16D 67/00
[52] U.S. Cl. ................................ 192/8 C; 192/12 BA
[58] Field of Search ........................... 192/8 C, 12 BA

[56] References Cited

U.S. PATENT DOCUMENTS

| | | | |
|---|---|---|---|
| 1,770,449 | 7/1930 | Ackerman et al. | 192/8 C |
| 1,833,615 | 11/1931 | Myers | 192/8 C |
| 1,849,902 | 3/1932 | Ackerman et al. | 192/8 C |
| 1,874,215 | 8/1932 | Ackerman et al. | 192/8 C |
| 2,001,758 | 11/1932 | Zwierzina | 192/8 C |
| 2,145,666 | 1/1939 | Roethel | 192/8 C |
| 4,651,854 | 3/1987 | Harada | 192/8 C |

*Primary Examiner*—Rodney H. Bonck
*Assistant Examiner*—Andrea Pitts
*Attorney, Agent, or Firm*—Finnegan, Henderson, Farabow, Garrett & Dunner

[57] ABSTRACT

A spring coupler comprises a casing, a drive member rotatably mounted within the casing including a main portion and a core portion fixedly connected thereto by staking manner, a driven member rotatably mounted within the casing including a main portion and a core portion fixedly connected thereto by stacking manner and engageable with the core portion of the drive member upon rotation thereof, and a coil spring disposed between the drive member and the casing so as to be engaged frictionally with the casing in the free state thereof and including a first tang and a second tang. In this spring coupler, the first tang and the second tang of the coil spring are engaged with the core portion of the drive member in rotation in one direction and the other direction respectively before the drive member is brought into engagement with the core of the driven member thereby reducing the radius of the coil spring whereas the first tang and the second tang of the coil spring are engaged with the core portion of the driven member in rotation in one direction and the other direction respectively, thereby expanding the radius of the coil spring. The main portion and the core portion are fixedly connected with each other by staking manner so that less time and less cumbersome operations are required for assembling the drive member and/or the driven member.

1 Claim, 4 Drawing Sheets

FIG. 4
FIG. 5
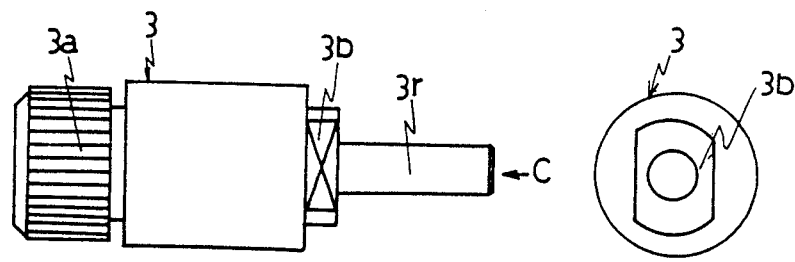
FIG. 6
FIG. 7
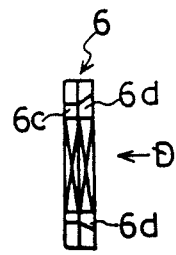
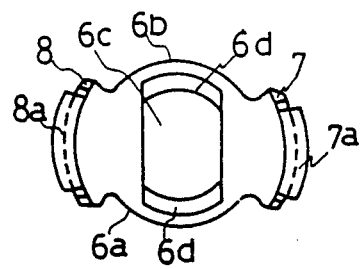
FIG. 8
FIG. 9
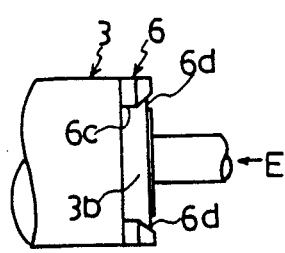
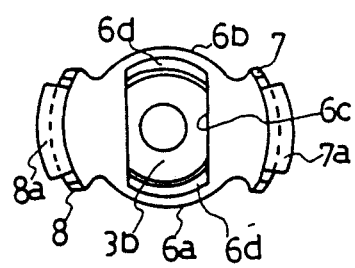

SPRING COUPLER

BACKGROUND OF THE INVENTION

1. Field of the Invention

The present invention relates to a one-way spring coupler through which rotation is transmitted from a drive member to a driven member but rotation is not reversibly transmitted.

2. Description of the Prior Art

A conventional spring coupler is disclosed in U.S. Pat. No. 4,651,854. In this spring coupler, upon rotation of a drive member in one direction, the drive member is brought into engagement with an end portion or a tang of a coil spring resulting in a reduction of the radius thereof Thus, the frictional contact between the coil spring and an inner surface of a casing is released so that the rotation of the drive member is transmitted to a driven member.

The drive member includes a main portion as a dial at which the rotation is applied and a core portion through which rotation is transmitted to a core portion of the driven member. For constituting the drive member; the main portion and the core portion are formed integrally with each other in a mold during the insert-formation of the core portion. For constituting the driven member, the main portion and the core portion each, of which is made with a sintered metal are, coupled with each other. In order to assure the connection therebetween, copper-infiltration is employed.

However, the conventional spring coupler has drawbacks because considerable time and cumbersome operations are required to constitute the drive member and/or the driven member.

SUMMARY OF THE INVENTION

It is, accordingly, an object of the present invention to eliminate the above-mentioned disadvantages or drawbacks.

In order to eliminate the above-described drawbacks or disadvantages, the present invention provides a spring coupler comprising (1) a casing, (2) a drive member rotatably mounted within the casing and including (2-1) a main portion and (2-2) a core portion fixedly connected thereto by staking manner, (3) a driven member rotatably mounted within the casing and including (3-1) a main portion and (3-2) a core portion fixedly connected thereto by staking manner and engageable with the core portion of the drive member upon rotation thereof, and (4) a coil spring disposed between the drive member and the casing so as to be engaged frictionally with the casing in the free state thereof and including a first tang and a second tang, wherein the first tang and the second tang of the coil spring are engaged with the core portion of the drive member in rotation in one direction and the other direction respectively before the drive member is brought into engagement with the core of the driven member thereby reducing the radius of the coil spring wheareas the first tang and the second tang of the coil spring are engaged with the core portion of the driven member in rotation in one direction and the other direction, respectively, thereby expanding the radius of the coil spring.

Since the main portion and the core portion are fixedly connected to each other by staking manner, upon assembling the drive member and/or the driven member; the above-mentioned disadvantages or drawbacks are eliminated.

BRIEF DESCRIPTION OF THE DRAWINGS

FIG. 4 is a side view of a main portion of a drive member:

FIG. 5 is a view seen from a direction indicated by an arrow C in FIG. 4:

FIG. 6 is a side view of a core portion of the drive member:

FIG. 7 is a view seen from a direction indicated by an arrow D in FIG. 6:

FIG. 8 is a view illustrating the connection between the main portion and the core portion in the drive member: and FIG. 9 is a view seen from a direction indicated by an arrow E in FIG. 8.

DESCRIPTION OF THE PREFERRED EMBODIMENT

Figure 1:
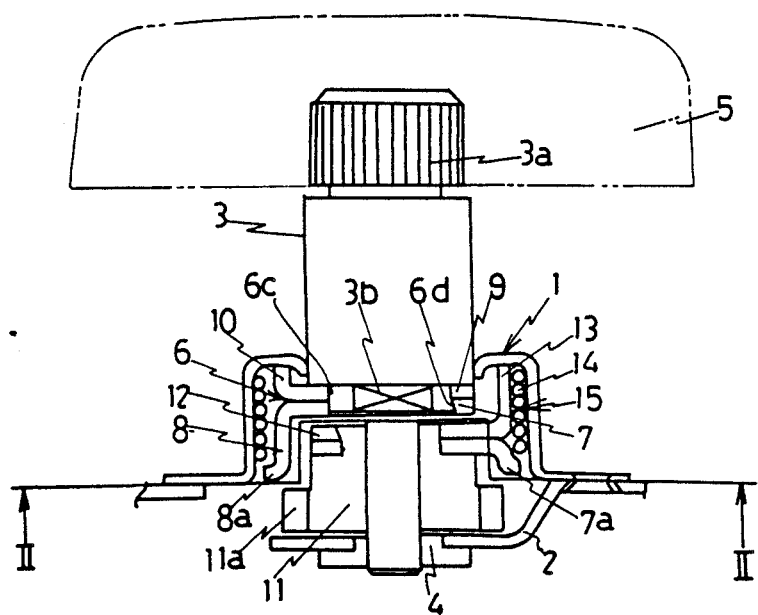
FIG. 1 is a vertical sectional view of a spring coupler in assembled condition according to the present invention.
Figure 2:
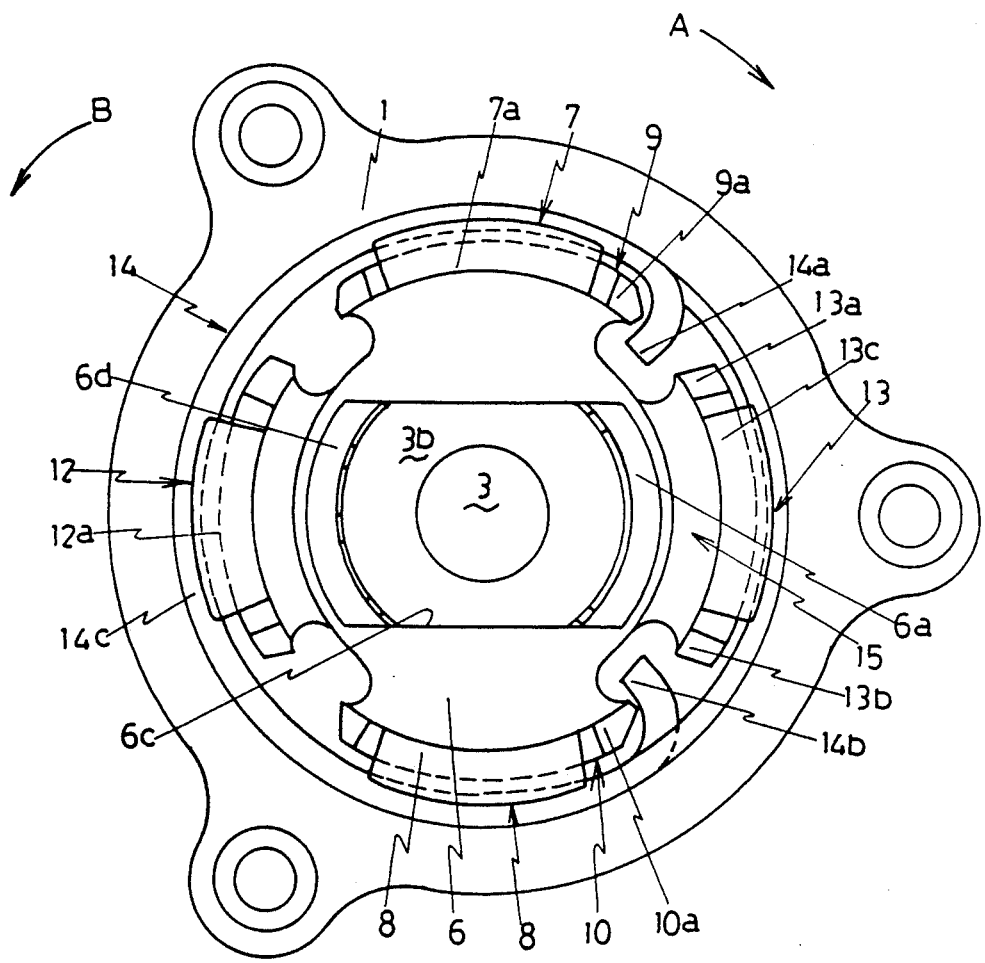
FIG. 2 is a cross sectional view taken along the line II—II in FIG. 1.
Figure 3:
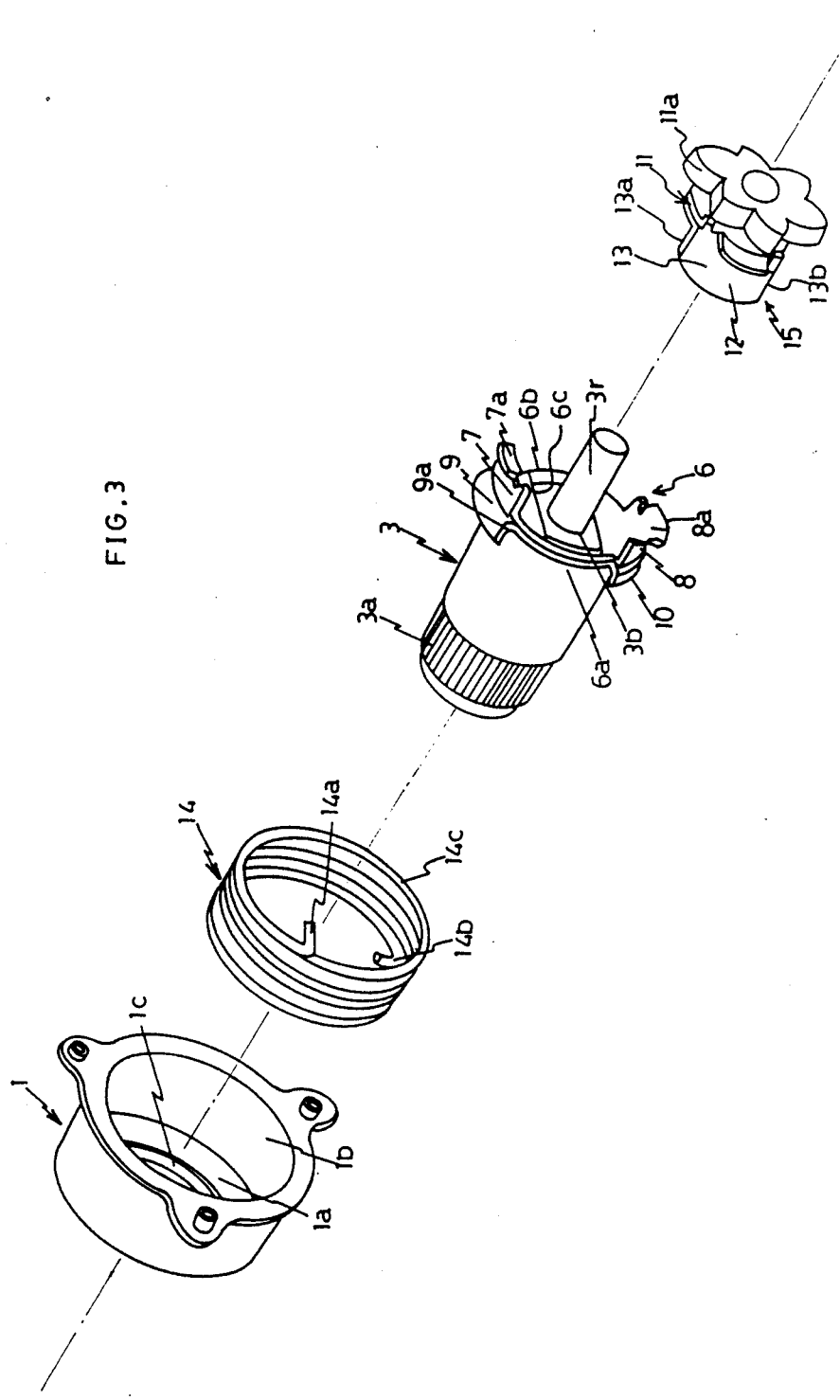
FIG. 3 is an exploded perspective view of the spring coupler according to the present invention.

Referring now to FIGS. 1 through 3, a casing 1 includes an upper portion 1a with an aperture 1c and an opened lower portion 1b to which a base plate 2 is fixed. The base plate 2 is provided with a bearing 4 which is an alignment with the aperture 1c at a space. A handle shaft 3 as a main portion of a drive member has a reduced section 3r which is rotatably mounted on the bearing 4 and an enlarged portion 3a which passes through the aperture 1c. The enlarged portion 3a of the shaft 3 is connected with a knob 5.

The shaft 3 is fixed with a core 6 for unitary rotation. The core 6 is obtained by pressing. In detail, as shown in FIGS. 4 and 5, a connecting section 3b having an oval-shaped cross-section is provided between the enlarged section 3a and the reduced section 3r. As shown in FIGS. 6 and 7, the core 6 includes an aperture 6c having an oval shape in cross-section similar to the connecting portion 3b for receiving connecting portion 3b therein. As shown in FIGS. 8 and 9, the connecting section 3b after being received in the aperture 6c is staked according to a well-known manner along an inner chamfered periphery 6d of the aperture 6c with the result that the staked portion is brought into engagement with the inner chamfered periphery 6d of the aperture 6c without interferring with other members. Thus, the shaft 3 and the core 6 are fixed with each other.

The core 6, as apparent from FIGS. 1 through 3, includes a first flange 7 bent towards the reduced section 3r, a second flange 9 bent toward the enlarged section 3a and adjacent to the first flange 7, a third flange 8 bent towards the reduced section 3r, and a fourth flange 19 bent toward the enlarged section 3a and adjacent to the third flange 8. Between a first set of flanges 7 and 9 and a second set of flanges 8 and 10, there are defined a pair of spaces 6a and 6b.

On the reduced section 3r of the shaft 3, there is rotatably mounted a main portion 11 of a driven member. A pinion-gear 11a is fixedly mounted on the main portion 11 and is in mesh-engagement with a device (not shown). A core 15 obtained by pressing is fixedly connected at one end of the main portion 11 of the driven member by staking. The core 15 includes a first flange 12 and a second flange 13 which are disposed in the space 6a and the space 6b respectively.

A coil spring 14 is interposed between the casing 1 and the shaft 3 and frictionally contacts an inner wall of the casing 1 One tang 14a of the spring 14 is bent inwardly in the radial direction relative to a loop portion 14c of the spring 14 and is engageable with either radial end 9a of the flange 9 of the core 6 or a radial end 13a of the falnge 13 of the core 15. The other tang 14b of the spring 14 is bent inwardly in the radial direction relative to a loop portion 14c of the spring 14 and is engageable with either a radial end 10a of the flange 10 of the core 6 or a radial end 13b of the falnge 13 of the core 15.

The flange 7 of the core 6 (the flange 8 of the core 6/the flange 12 of the core 15/the flange 13 of the core 15) includes an outward projection 7a (8a/12a/13c) in the radial direction and each projection supports the loop portion 14c of the spring 14 to prevent the extraction thereof from the casing 1.

In operation, upon rotation of the knob 5 in the clockwise direction which is indicated by an arrow A in FIG. 2, the core 6 is rotated together with the shaft 3 to which the knob 5 is fixedly connected. Due to resulting rotation of the core 6, the radial end 9a of the flange 9 of the core 6 is brought into engagement with the tang 14a of the spring 14. Due to further rotation of the core 6, the radius of the loop portion 14c of the spring 14 is reduced, thereby releasing the frictional conncetion between the spring 14 and the inner wall of the casing 1. Thus, the rotation of knob 5 is being transmitted to the pinion-gear 11a through the shaft 3, core 6 and the spring 14. If knob 5 is rotated in the counter-clockwise direction which is indicated by an arrow B, a similar operation is performed so that the rotation of knob 5 may be transmitted to the pinion-gear 11a.

On the contrary, upon rotation of the pinion-gear 11a in the clockwise direction which is indicated by an arrow A in FIG. 2, the radial end 13b of the flange 13 of the core 15 is brought into engagement with the tang 14b of the spring 14, thereby expanding radius of the loop portion 14c of the spring 14. Thus, frictional connection between the spring 14 and the inner wall of the casing 1 is further increased resulting in spring 14 being prevented from rotating. Thus, the clockwise rotation of the pinion-gear 11a may not be transmitted to the shaft 3. Similarly, the counter-clockwise rotation of the pinion-gear 11a also may not be transmitted to the shaft 3.

What is claimed is:
1. A spring coupler comprising:
   a casing;
   a drive member rotatably mounted within said casing, said drive member including a shaft having a connecting section with an oval cross section and a core having an oval aperture with inner chamfered surfaces, said connecting section of said shaft being staked into said oval aperture of said core with said connecting section engaging said inner chamfered surfaces to fixedly secure said shaft to said core;
   a driven member rotatably mounted within said casing, said driven member including a main portion and a core portion press fit together to be fixedly secured, said driven member core portion being engageable with said drive member core upon the rotation thereof; and
   a coil spring disposed between the drive member and the casing and normally engaged with said casing, said coil spring having first and second tangs, wherein said drive member engages said first or second tang upon rotation in a clockwise or a counterclockwise direction, respectively, thereby reducing the radius of said coil spring and transmitting rotation to said driven member and whereby said driven member engages said first or second tang upon rotation in a clockwise or counterclockwise direction, respectively, thereby expanding the radius of said coil spring and preventing rotation of said drive member.

* * * * *

UNITED STATES PATENT AND TRADEMARK OFFICE
CERTIFICATE OF CORRECTION

PATENT NO. : 4,953,676

DATED : SEPTEMBER 4, 1990

INVENTOR(S) : YUKIFUMI YAMADA et al.

It is certified that error appears in the above-identified patent and that said Letters Patent is hereby corrected as shown below:

In the Abstract:

Line 6, change "stacking" to --staking--.

Signed and Sealed this

Twenty-fourth Day of December, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,953,676
DATED : SEPTEMBER 4, 1990
INVENTOR(S) : YUKIFUMI YAMADA et al.

It is certified that error appears in the above-identified patent and that said Letters Patent is hereby corrected as shown below:

ON THE TITLE PAGE

"[73] Assignee: Aisin Seiko Co. Ltd., Japan" should be

--[73] Assignee: Aisin Seiki Co. Ltd., Japan--.

Column 1, line 17, "thereof Thus" should be --thereof. Thus--

Signed and Sealed this

Fifth Day of May, 1992

Attest:

DOUGLAS B. COMER

Attesting Officer

Acting Commissioner of Patents and Trademarks